United States Patent
Schild et al.

(10) Patent No.: US 10,950,898 B2
(45) Date of Patent: Mar. 16, 2021

(54) METHOD AND DEVICE FOR DEPASSIVATION OF A BATTERY OF A CASH AND VALUABLES CONTAINER

(71) Applicant: Wincor Nixdorf International GmbH, Paderborn (DE)

(72) Inventors: Michael Schild, Nordhein-Westfalen (DE); Sascha Ringel, Nordhein-Westfalen (DE)

(73) Assignee: Wincor Nixdorf International GmbH, Paderborn (DE)

(*) Notice: Subject to any disclaimer, the term of this patent is extended or adjusted under 35 U.S.C. 154(b) by 329 days.

(21) Appl. No.: 15/397,764

(22) Filed: Jan. 4, 2017

(65) Prior Publication Data
US 2017/0200983 A1 Jul. 13, 2017

(30) Foreign Application Priority Data
Jan. 11, 2016 (DE) .................... 10 2016 103 341.7

(51) Int. Cl.
*H02J 7/00* (2006.01)
*H01M 10/42* (2006.01)
(Continued)

(52) U.S. Cl.
CPC .......... *H01M 10/425* (2013.01); *E05G 1/005* (2013.01); *E05G 1/10* (2013.01); *E05G 1/12* (2013.01);
(Continued)

(58) Field of Classification Search
CPC ............................. H01M 10/425; E05G 1/005
(Continued)

(56) References Cited

U.S. PATENT DOCUMENTS 8,253,380 B2 * 8/2012 Sun ...................... G01R 31/367
320/128
8,847,785 B2 * 9/2014 Heath ................. H01M 10/425
320/100
(Continued)

FOREIGN PATENT DOCUMENTS

DE 102011053443 A1 3/2013
EP 0 948 828 6/2001
(Continued)

OTHER PUBLICATIONS

Search Report, dated Jul. 25, 2017, for corresponding German application No. 102016100341.7.
(Continued)

*Primary Examiner* — Yalkew Fantu
(74) *Attorney, Agent, or Firm* — Black, McCuskey, Souers & Arbaugh LPA

(57) ABSTRACT

A method (100) for depassivation of a battery (BATT) of a cash and valuables container (10) includes at least one electronically controllable component (14) and an associated control circuit (18) being supplied by the battery (BATT). The control circuit (18) executes at least one control procedure for the at least one electronically controllable component (14). The valuables container can be transportable, e.g. a cash box (10), and includes an invalidation unit, in particular an ink dyeing system (14). The control circuit (18) then also executes the depassivation (120) of the battery (BATT) each time before activating or deactivating the at least one control procedure (130) or a sub-routine thereof, such as the sub-routine for controlling and driving the ink dyeing system. Specifically, the depassivation of the battery (BATT) is performed before each first/initial execution of the least one control procedure (130).

14 Claims, 5 Drawing Sheets

(51) Int. Cl.

| | | |
|---|---|---|
| *G07D 11/225* | (2019.01) | |
| *E05G 1/00* | (2006.01) | |
| *E05G 1/10* | (2006.01) | |
| *E05G 1/12* | (2006.01) | |
| *E05G 1/14* | (2006.01) | |
| *G07D 11/00* | (2019.01) | |
| *H01M 10/052* | (2010.01) | |
| *H01M 10/44* | (2006.01) | |
| *H01M 10/48* | (2006.01) | |

(52) U.S. Cl.
CPC .............. *E05G 1/14* (2013.01); *G07D 11/009* (2013.01); *G07D 11/225* (2019.01); *H01M 10/052* (2013.01); *H02J 7/0069* (2020.01); *H01M 10/44* (2013.01); *H01M 10/48* (2013.01); *H01M 2010/4271* (2013.01)

(58) Field of Classification Search
USPC ........................................................ 320/134
See application file for complete search history.

(56) References Cited

U.S. PATENT DOCUMENTS

| | | | | |
|---|---|---|---|---|
| 9,570,934 | B2* | 2/2017 | Venkataramani | H02J 7/0075 |
| 2004/0189249 | A1* | 9/2004 | Beals | H02J 7/0063 |
| | | | | 320/116 |
| 2010/0168903 | A1* | 7/2010 | Aas | G07D 11/125 |
| | | | | 700/214 |
| 2011/0155026 | A1* | 6/2011 | Villiger | G07D 11/0006 |
| | | | | 109/40 |
| 2014/0338181 | A1* | 11/2014 | Allgaier | G01R 31/3679 |
| | | | | 29/593 |
| 2014/0368345 | A1* | 12/2014 | Dobbins | G08B 13/02 |
| | | | | 340/568.7 |
| 2015/0027354 | A1* | 1/2015 | Berendes | E05G 1/005 |
| | | | | 109/25 |
| 2015/0326049 | A1* | 11/2015 | Cooley | H01G 11/58 |
| | | | | 320/130 |

FOREIGN PATENT DOCUMENTS

| | | | |
|---|---|---|---|
| EP | 2463831 | A2 | 6/2012 |
| EP | 2 736 023 | | 5/2014 |
| EP | 2736023 | * | 5/2014 |
| EP | 2736023 | A1 | 5/2014 |
| WO | 98/08265 | | 2/1998 |

OTHER PUBLICATIONS

Machine Translation, dated Dec. 18, 2017, for DE102011053443A1.
Machine Translation, dated Dec. 18, 2017, for WO 98/08265.
Machine Translation, dated Dec. 18, 2017, for EP2463831 A2.
Machine Translation, dated Dec. 18, 2017, for EP2736023 A1.
European Search Report dated May 4, 2017.

* cited by examiner

METHOD AND DEVICE FOR DEPASSIVATION OF A BATTERY OF A CASH AND VALUABLES CONTAINER

BACKGROUND

1. Field of the Invention

The invention relates to a method for the depassivation of a battery of a valuables container which is equipped with a battery and comprises at least one electronically controllable component. The invention particularly relates to a portable container for cash and valuables, which is equipped with a invalidation unit for the valuables, such as bank notes, vouchers or the like, being transported by said container. Moreover, the invention relates to such a kind of valuables container which comprise a control unit/circuit that is configured to execute one or more control procedures for the at least one electronically controllable component, in particular control procedures for activation and deactivating of operating modes of the at least one component or of the invalidation unit.

2. Description of the Related Art

In the field of cash and valuables containers, especially of portable cash and valuables containers, such as cash boxes, it is known to equip them with battery-powered components which ensure, inter alia, a proper use of the respective cash and valuables containers and which prevent or hinder from manipulation and/or from attempted theft. For example, cash boxes are known which are equipped with invalidation means for the transported bank notes, vouchers or security documents, in particular with so-called ink dyeing systems or kits which dye the bank notes, if a manipulation of the cash box occurs, by using distinctive and not removable colored ink. Already by that the cash boxes are equipped with such ink dyeing kits, it can be achieved to impede manipulation and theft in a very efficient way.

EP 2 736 023 A1 discloses a cash box with means for monitoring its operating mode. The cashbox contains a receiving area or compartment for receiving bank notes or vouchers, a sensor unit for detecting tampering attempts, a memory element for storing data on information about attempted manipulation and a control unit for controlling the invalidation unit to possibly invalidate the bank notes irreversibly. In an activated operating mode of the cashbox, when a manipulation attempt has been detected, the control unit stores data with information about the manipulation attempt and also triggers the invalidation unit. In a deactivated operating mode of the cash box, however, the control unit does not trigger the invalidation and also does not store any data with information, even if a manipulation attempt occurs. The control unit, the invalidation unit and optionally further components are electrically powered by a battery, preferably by a lithium battery.

Due to the chemical structure of certain battery types, especially of lithium batteries, there may happen a passivation during the non-use/storage of the battery. This means that in a stored and unused battery a passivation film is formed which causes the clamp voltage of the battery to decrease under load and not to reach the nominal value, unless the passivation film in the battery will be removed by making more use of the battery. As long as a passivation film exists, the battery and thus the supplied device are both not fully operational. Usually, a depassivation of the battery is carried out manually by connecting a certain load (auxiliary load) to the battery terminals/clamps, in order to remove the passivation film before the battery is put into normal operation. However, this method is cumbersome and often takes a few minutes, what cannot be tolerated for many applications, such as the operation of cash boxes and valuables containers, because they should be ready to use at any time.

In the field of so-called back-up batteries, which are used for emergency power supply of larger facilities being connected to the electric supply network, methods for depassivation are known as those being disclosed in EP 0 948 828 B1.

The object of the invention is to provide a method for the depassivation of a battery of a cash and valuables container; the method shall overcome the above problems and in particular shall avoid the need to perform a manual, time-consuming and elaborate depassivation. In addition, a cash and valuables container shall be provided, the container comprising at least one electronically controllable and battery-operated component, and a control circuit which is configured to execute the depassivation method.

SUMMARY

Accordingly, there is provided a method being suitable for depassivation of a battery of a cash and valuables container, comprising at least one electronically controllable component and an associated control circuit which is electrically supplied by the battery, wherein the control circuit executes at least one control procedure for the at least one electronically controllable component, and wherein the control circuit also executes the depassivation of said battery, namely in context with the activation or deactivation of the at least one control procedure or of a sub-routine thereof. In particular, the depassivation of the battery is executed before every activation or deactivation of the control procedure or sub-routine.

By this invention, a direct functional integration of a depassivation routine in one or more existing control procedures and/or sub-routines can be achieved, whereby synergies are obtained, such as utilization of existing hardware and software, integration of a depassivation function into existing user interfaces, etc. For example, it can be very beneficial to integrate the invention into the control procedure(s) of an ink dyeing system, thereby enabling the ink dyeing system to self-monitor the battery state and to execute a depassivation if necessary, and then depending on whether the depassivation was successful or not, to change the starting point for a standard procedure. For example, in the case of the use of the cash and valuables container in practice, the battery may be tested and, if necessary, subjected to a passivation. Only when the depassivation has been successful and the clamp voltage or system voltage is sufficiently high, an initial state is changed from which a standard procedure (routine) can be started, such as, for example, a routine for making the ink dyeing system armed ("sharp"). When starting from a factory pre-assembly before the cash box will be delivered to the customer/user (e.g. to a money transportation service company), there is a first initialization state which will not be activated before the battery has been checked and a necessary depassivation has been successfully carried out. It can thus be effectively prevented from delivering cash boxes with insufficient battery quality. This means that in both cases (re-commissioning; first delivery) an automatic battery check can guaranty that each battery-powered cash and valuables container is only released for use or delivery, for an E2E (end-to-end) process, when the battery is fully in the state of ready for use.

The depassivation of the battery preferably is carried out before a first execution of the at least one control procedure. Preferably, the depassivation of the battery is executed in dependence on those operating conditions and/or operating modes of the valuables container that can be activated and/or deactivated by the at least one control procedure.

For example, it can be provided that by means of at least one control procedure (e.g. the control of ink dyeing kit) as a function of variable operating parameters, plural operating modes (OFF, init) of the at least one electronically controllable component (ink dyeing kit) are enabled or disabled, and that at least one of the operating modes is activated or deactivated only if the battery has been successfully depassivated. In this context, the battery depassivation may be performed before any first activation or deactivation of the at least one of the operating modes.

The at least one electronically controllable component may an invalidation unit for valuables being transported within said container, valuables, especially for invalidating bank notes and/or vouchers or other valuables, and the control procedure may be carried out for an event-driven operation of the invalidation unit, particularly for an operation or operating mode that includes an invalidation of the valuables and particularly in the event of a manipulation/tampering that occurs at the cash and valuables container. For example, this involves a sub-routine that "sharpens" the ink dyeing kit and triggers it in case of manipulation.

The method may comprise one or more of the following steps:

Depassivation of the battery by connecting a load and measuring the decrease and the subsequent increase of the clamp voltage;

Checking if the clamp voltage exceeds a predetermined reference value or not;

when the clamp voltage exceeds the predeterminable reference value, the depassivation is successfully completed and the control procedure is started; otherwise the depassivation is continued;

Checking whether, for the entry into a first operating state, an operating parameter is set or not;

if the operating parameter is set, a first operating mode, by entry into the first operating state, is activated;

If the operating parameter is not set, a second operating mode, by entry into a second operating state, is activated;

Checking in the first operating state, if the operating parameter is still set or not;

if the operating parameter is still set, the first operating state is maintained and the first operating mode remains activated; otherwise, it is switched to the second operating state changed;

Checking in the second operating state, if the operating parameter is still not set or shall now be set;

If the operating parameter is still not is set, the second operating state is maintained and the second operating mode remains activated; otherwise, it is switched to the first operating state.

During the execution of the step for checking the clamp voltage, said voltage is monitored for a predetermined period of time to obtain the temporal development of the clamp voltage in comparison with the reference value. Depending on the identification it is decided whether to end or to continue with the depassivation of the battery. In this context, it may be preferable to preset the reference value in dependence on the ambient temperature. For example, the reference value may be increased when the ambient temperature rises.

The method can be developed so that the operating modes include different operating states, in particular an output state to start the operation of the cash and valuables container, and an initialization state for the factory delivery of the cash and valuables container. The operating mode of the respective activated operation state may be displayed on a display of the cash and valuables container, and a depassivation mode may be displayed when the depassivation of the battery is executed. Further it can be provided that on said display or on a specific one of the cash and valuables container, a display element for the magnitude of the measured clamp voltage is shown.

These features ensure that the running control procedure checks and verifies, at least when a first entry into a mode is performed, that the battery does not need to be passivated or otherwise makes sure that a depassivation will be performed successfully.

This embodiment relates to, for example, cash boxes having an ink dyeing system as invalidation unit that is released in case of tampering or theft. Manipulation monitoring is accompanied by the monitoring and, if necessary, by the depassivation of the battery.

The reference voltage can be preset as a function of the ambient temperature, in particular when there is an increase of the ambient temperature, the reference voltage can be increased.

The operating modes of the method may include various operating states, in particular an off-state ("OFF") and an initialization state ("init") of the invalidation unit. The depassivation of the battery always is executed at least before the first entry into one of said operating states.

The inventive container for cash and valuables is provided with at least one electronically controllable component, a control circuit connected therewith, and a battery. The control circuit may be designed to perform one or more control procedures for the at least one electronically controllable component, and the control circuit may be designed to implement the method disclosed herein for depassivation the battery. Preferably the cash and valuables container comprises at least one of the following features:

The battery is a lithium battery;

The control circuit comprises a microcontroller;

The at least one electronically controllable component comprises an invalidation unit, in particular an ink dyeing system for the valuables being transported in the cash and valuables container, in particular for bank notes and/or vouchers;

The cash and valuables container has a display for displaying operating modes of the respectively activated operating states and/or for indicating a depassivation mode and/or has a display element for indicating the magnitude of the measured clamp voltage of the battery.

The invention and the advantages derived therefrom will be described in detail with reference to embodiments and with reference to the accompanying drawings.

DETAILED DESCRIPTION

Figure 1:
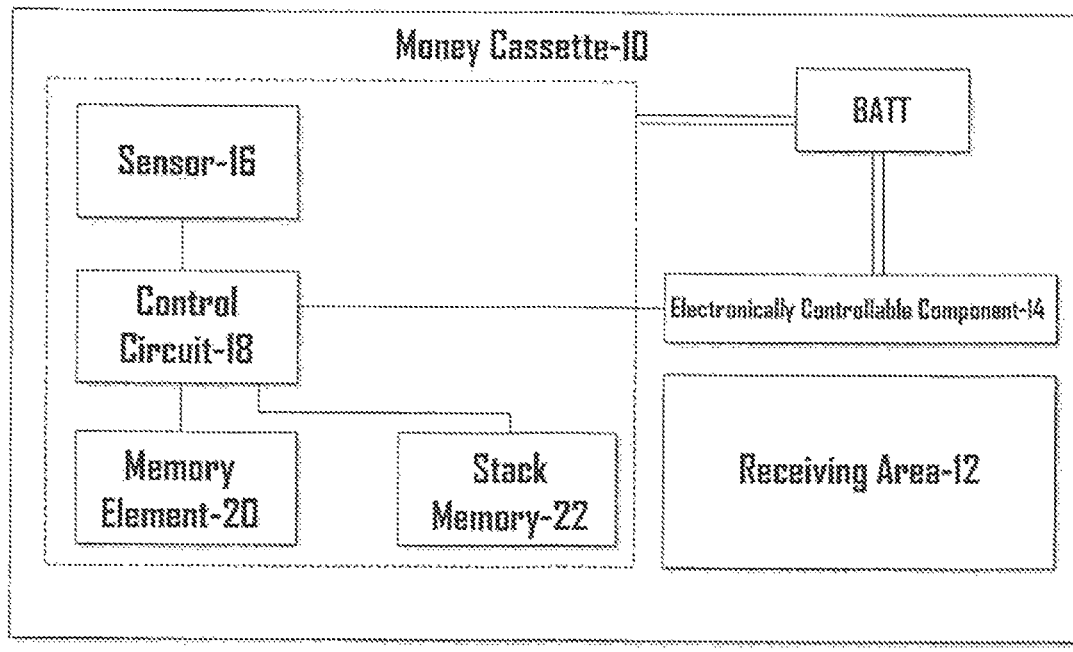
FIG. 1 shows as a block diagram the construction of a cash and valuables container according to the invention, which is designed as a cash box.

FIG. 1 is a schematic block diagram of the structure of a valuables container 10 of the invention, referred to herein as cash box. The cash box 10 includes a receiving area 12 in which objects of cash and valuables, in particular bank notes and/or vouchers, can be received, e.g. in the form of stacks of bank notes or vouchers. Furthermore, the money cassette 10 contains an invalidation unit 14, which is designed here as an ink-inking system (so-called ink kit). Such an ink kit comprises a dye container in which dye is contained for the irreversible coloration of the bank notes received in the receiving area 12. If the ink kit 14 is triggered, the dye is sprayed on the bank notes via a spray device. For this purpose, the explosive capsule of a gas pressure cartridge is opened when being triggered, so that the gas which is under high pressure escapes and transports the dye out of the dye container. In addition, the money cassette 10 comprises one or more sensor units 16, with the aid of which manipulation attempts of the money cassette 10 can be detected. For this purpose, a variety of different types of sensors are used, with the aid of different status and/or operational conditions of the cashbox 10 can be monitored for tamper protection. For example, fluid sensors, gas sensors, position sensors, sensors for monitoring the opening of the cashbox lid and/or—are provided shutters.

In addition, the cash box/cassette includes a control unit 10 or control circuit 18, by which the cash box 10 and the electrical and/or electronic components therein are controlled. The cashbox, particularly the in-built electrical or electronic components are supplied/powered by a battery BATT which preferably is a lithium battery.

Among the electrical components being controlled by the control circuit 18 there is the invalidation unit or ink kit 14 which is operated by one or more control procedure being executed by the control circuit 18. In particular, this includes a procedure for detecting manipulation attempts or triggers the ink kit 14, if needed. Moreover, the control circuit 18, which in particular has a micro-controller, can store obtained data in a memory element 20, such as data or information on manipulation attempts being detected by the sensor unit 16. Further to this, the cash box 10 has a stack memory 22 to store data on the current inventory of bank notes and to record this information. Both memories 20 and 22 can also be implemented as two logic storage areas in a hardware component.

By means of the control circuit 18 various modes of operation for the cashbox 10 can be preset, wherein one of these operating modes is set in dependence of the actual method step during the operation of the cash box. Setting the respective modes of operation is carried out in this case on the basis of predetermined criteria, preferably automatically by the control circuit 18. The control of the cash box or of its electrical components (such as here of the ink kit 14) is executed, for example, within control procedures which activate and deactivate various operating modes and associated operating states. Such a control method is known per se and is disclose for example in EP 2 737 023 A1 which relates to the monitoring and detection of tampering attempts at a cashbox and whose content is hereby incorporated by reference in the disclosure of this application.

Furthermore, also the content of EP 2 463 831 A2 which relates to a method for starting and operating a cashbox, is hereby included by reference in the disclosure of this application. The methods disclosed in these references/documents are considered to be examples of control procedures which can also be executed by the control circuit 18 of the invention, to put the cash box into operation and to carry out and monitor the operation of the internal components.

Figure 2A:
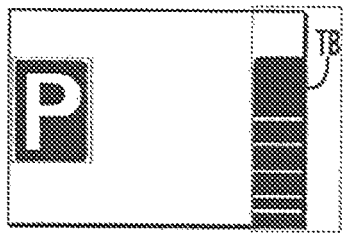
FIGS. 2A-2C show various display views of operating conditions which occur in context with a depassivation of the battery of the cash box.

By means of the FIGS. 2a)-2c) and FIGS. 3 and 4, an inventive method 100 will here now be described that achieves an integration of a depassivation procedure (step sequence 120) in one or more such control procedures (step sequence 130).

Figure 3:
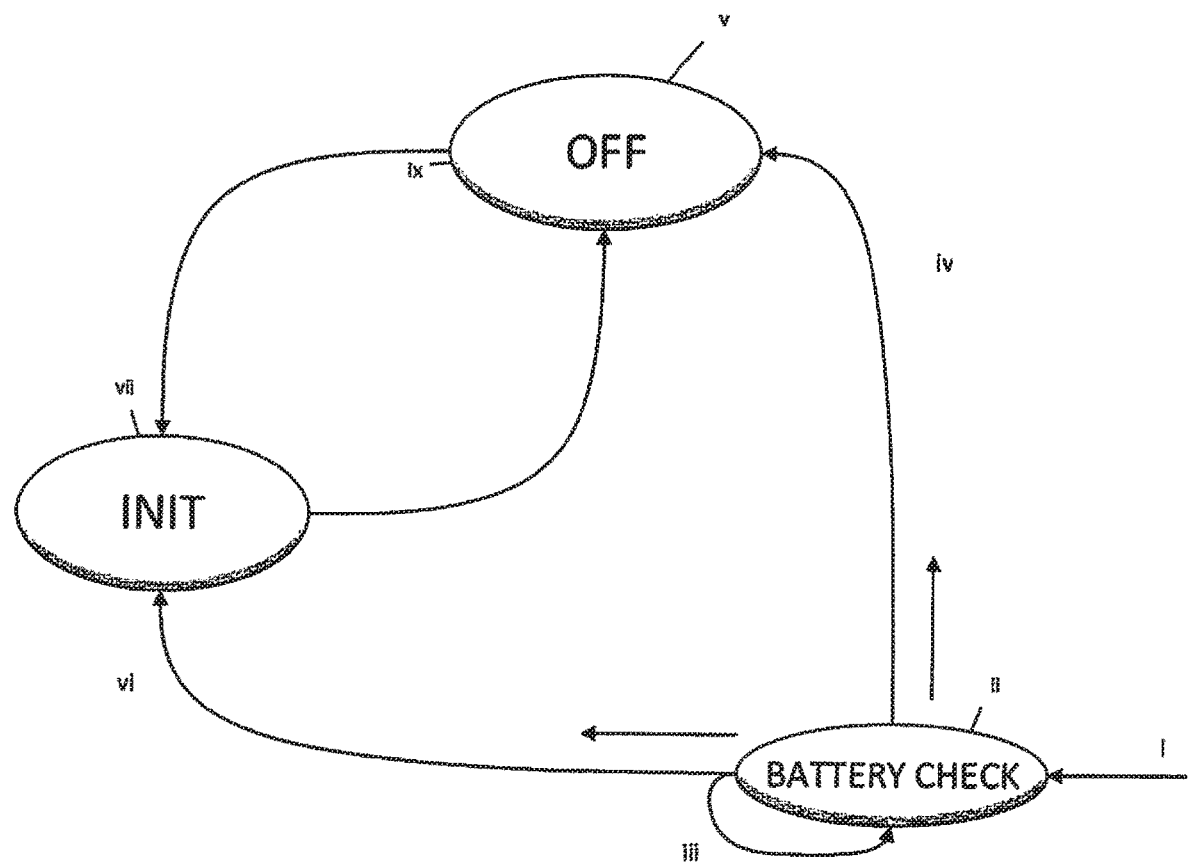
FIG. 3 shows, in the form of a state diagram of a state machine, the states of operation which can be transferred into one another.

First, the method 100 is started at step 110, which essentially means that a new battery is inserted or the cash box having already a battery in use, shall now be prepared for re-use (see also arrow (i) in FIG. 3).

Figure 4:
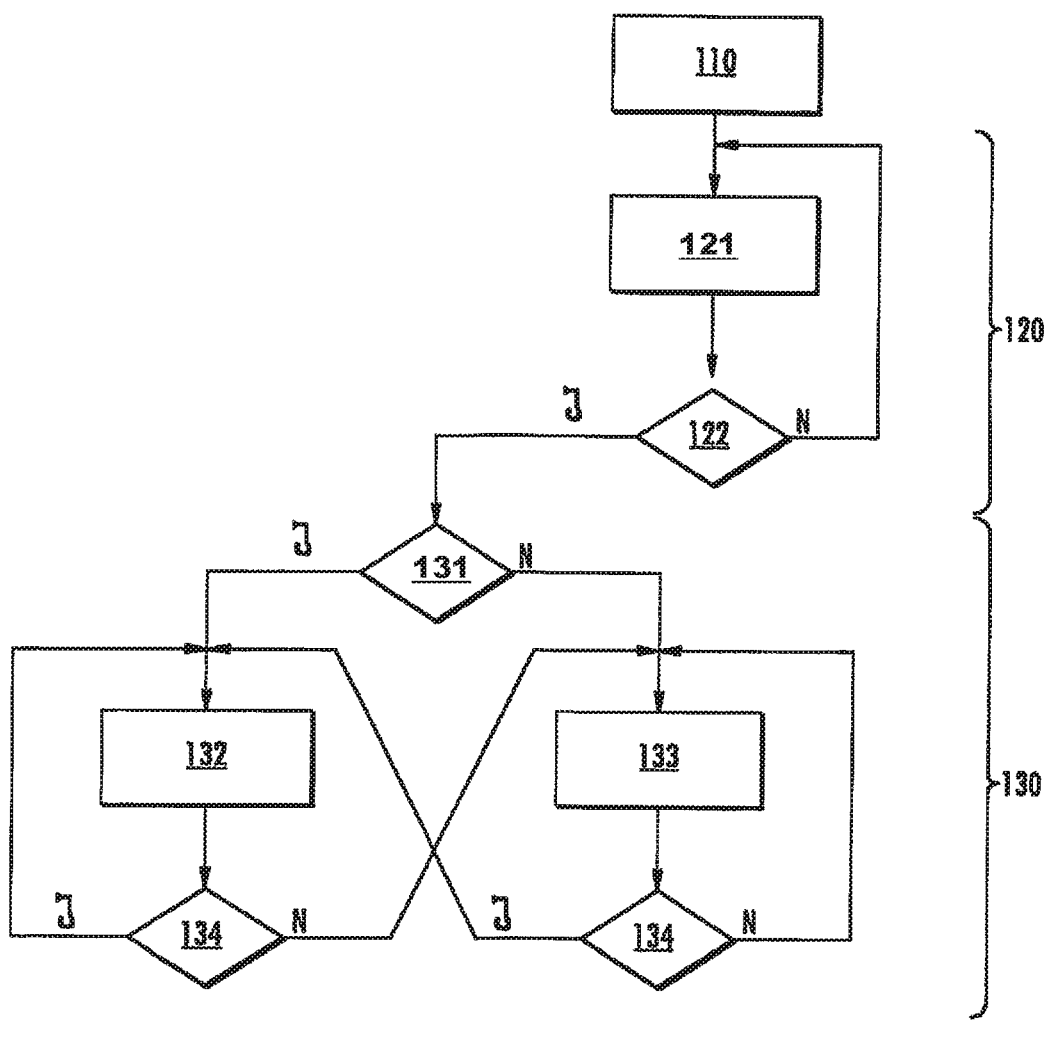
FIG. 4 shows this in the form of a flow chart, the steps of the method for a cash container battery depassivation being integrated into an existing control procedure.

Then in step 121 of FIG. 4 the real test of the battery is performed first (see also in FIG. 3 state (ii) "Battery Check"), wherein a depassivation is then performed when certain parameters indicate the need for this. This can e.g. be the shelf life of the battery or the non-operating time; this can also be a measurement parameter for the clamp voltage. While a depassivation is carried out, this can be displayed on a display of the cash box (see FIG. 2a). Although if the system voltage is available, but the depassivation has not been successful (arrow (iii) in FIG. 3), the depassivation is repeated if necessary.

Figure 2B:
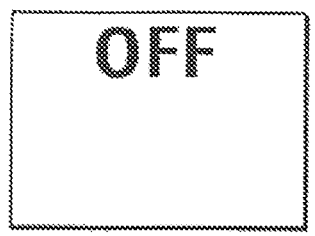

If depassivation has been carried out in step 122 FIG. 4, it is checked whether the depassivation was successful, that is, whether the battery is really ready. This can be checked by means of clamp voltage measurements or the like. If the depassivation was successful, the process can proceed to the actual control procedure 130. This is indicated on a display of the cash box (see FIG. 2b). Otherwise, a depassivation is carried out, i.e. step 121 is repeated. If, after repeated attempts, the battery is still not ready for use, it is indicated that the battery has to be replaced (see FIG. 2c).

FIG. 3 represents a state machine, and further may be configured so that "BatteryCheck" is started in state (ii) and then the state is changed in the state machine depending on the result. For example, a money cassette with an open lid is regarded as a precondition.

In the negative case (iii) the container/cartridge remains in the state (ii) "BatteryCheck" and this state is reported to a higher software layer. In addition, a suitable symbol, here a flashing key, is displayed (see FIG. 2 c). When the function test starts a passed battery is reported, for example by error code "512". A cash box that remains in this mode, is then not usable for a E2E process and therefore cannot be activated. Thus it is avoided that a container/cassette with poor battery will be provided for transport.

In the positive case (iv) the cassette jumps into the state (v) which is a starting point ("OFF") for further standard procedures for operating the cassette, e.g. for commissioning of the ink dyeing system, for monitoring sensors (detection of manipulation or monitoring the cover etc.) or switching of signal lamps; displaying the status etc.

If there is a new cassette/cartridge which is to be delivered from the factory, it will then, after a successful depassivation (positive case vi), change to condition (vii) which represents an initialization state, i.e. the readiness that the cartridge can be delivered and then can be initialized or can be configured in a customer-specific manner. It is possible to switch back and forth between the states (v) and (vii) (see arrows viii and ix in FIG. 3). The states (vii) "init" and (v) "OFF" represent starting states form which higher software layers can be reached/addressed to set the cassette into an appropriate condition.

If the cash box, for example during a passivation, is inserted into a system (e.g. ATM), the passivation routine will be interrupted (see 120 in FIG. 4) and the cash box initially remains in thus state, i.e. the cash box cannot be used thus far.

Thus the FIG. 3 illustrates logic branching starting from a review and possible depassivation of the battery ("BatteryCheck") either towards the state "init" which relates to a defined delivery of the cashbox (i.e. factory setting at time of delivery) or towards the "Off" state which refers to a defined maintenance state of the cash box (already being practical use). Here, "Off" means that the invalidation unit of the cash box is switched off or deactivated. This does not mean, however, that all components of the cash box or even the box itself is switched off. Rather, the cash box when being in the "Off" state is ready for use (for transportation), although the invalidation unit is not (yet) armed. The respective states "init" or "Off" can also be understood as operating modes, which are controlled by their own control procedures. Also, each mode can be understood by a sub-routine of a superior control procedure. The arrows labeled "parameters set" refer to the parameters required to activate the mode. For example, the arrow iv means that the parameters for activating the "Off" mode are set after successful depassivation so that the "init" mode is not activated (see arrow vi).

As already disclosed above by means of the described FIGS. 1-4, the invention offers the advantage that the cash and valuables container is only ever taken into operation, when being delivered from the factory as well as later during (first) field use, if it is ensured, by means of testing and, if necessary, by depassivation, that the battery is ready for immediate use. The checking and depassivation of the battery is advantageously integrated into existing standard methods.

As to typical standard procedures, it has to be mentioned here that the activated mode and the monitoring mode in particular for the transport of the cashbox 10 (see FIG. 1) can be used in an unsecured environment in an unsecured process step, the control unit 18, in particular automatically, sets/starts either the activated or the monitoring operating mode, depending on how high the stack of valuables is. For this purpose, a limit/threshold in the control unit is set for being compared with the current inventory by the control unit. If the current inventory/stack is equal or greater to the limit, then the control unit 18 operates the cash box 10 in the activated operating mode, but if the current stack is smaller than the limit, then the control unit 18 operates the cash box 10 in the monitoring operating mode.

A triggering of the invalidation unit 14 with only a small stack of cash in the box 10 would be unprofitable, so that it is more sensible to let the bank notes be stolen out of the box by a thief instead of triggering the invalidation unit 14. By operating the cash cassette in the monitoring operating mode in case of such a low stack, a manipulation protection nevertheless takes place in which corresponding manipulation attempts are detected via the sensor unit 16 and are stored in the storage element 20. Thus, tampering attempts can be timely punished.

The data stored by the control unit 18 in the storage element 20 are configured so that from said data it can be derived whether the respectively logged manipulation attempt has been detected in the monitoring operating mode or the activated operating mode. Thus, it is easy to determine whether the invalidation unit 14 has been triggered or whether a "virtual triggering" has been made, i.e. the invalidation unit 14 has not actually been triggered via the stored data. Thus, in the event that the manipulation attempt has been detected in the monitoring operating mode and no triggering of the invalidation unit 14 has taken place, the money cassette 10 may be re-used if it is found that no actual manipulation has taken place or has not been successful and no damage has occurred. In particular, such error entries can be reset again in the case of a non-triggered invalidation unit 14 when the money cassette 10 is inserted into a device for handling valuables, so that this can be re-operated as planned.

The cash box is integrated into a so-called cash cycle. A cash cycle is understood to mean possible processes which can be passed through by the cash cassette 10 in its scheduled operation. These include in particular possible transport processes of the cashbox 10 between an ATM and a security transport vehicle (not shown). In the process described here, the setting of the respective operating mode by the control unit 18 takes place independently of the inventory of the money cassette 10 in valuables. As a criterion for the setting of the activated operating mode or of the monitoring operating mode, the respective position of the cash box 10 is used by the control unit 18 in the process steps, i.e. the location of the cash box 10.

When the cash box 10 is accommodated in the transport vehicle, it is at a relatively secure place, because the cash and valuables transport vehicle is armored. It is thus not necessary for the cash cassette 10 to be operated in the activated operating mode. Thus, error resolutions of the invalidation unit 14, that is, unnecessary releases of the invalidation unit 14, are pre-determined. Accordingly, the control unit 18 of the money cassette 10 sets the monitoring operating mode when the money cassette 10 is put into the transport vehicle. Compared to the deactivated operating mode, this has the advantage that possible manipulation attempts can be detected and thus can be punished promptly. During recording in the transport vehicle, only a very limited number of people, including the driver of the transport vehicle 58, have access to the cash box 10. If thus detects a tampering attempt during transport in the vehicle, it can easily be associated with these people and punished accordingly.

The transport of the cash box 10 between the vehicle and the ATM takes place in by means of a case/bag in which the money container/cassette 10 is held during transport. Alternatively, transport can also be unprotected. When the transport is made by a bag or suitcase, the cash box 10 has still to be withdrawn from a local rack in the vehicle and then put into said suitcase. Then the suitcase is locked with a security key. The control unit 18 is designed such that it or that appropriate sensors can detect with which key the suitcase has been locked and unlocked. When locking it with the security key, the control unit 14 employs the activated operating mode, because at next there will be an unprotected transport towards the ATM.

If in the reverse transport direction, the cashbox 10 is taken from the ATM and if the suitcase is locked by the security key, the control unit 18, once more employs the activated operating mode, because an unsecured transport occurs, again. If the suitcase will be unlocked in the transport vehicle by said security key, this will be detected by the control unit 18 and it changes from the activated mode of operation to the monitoring mode, because the unlocking with the security key clearly indicates that now the money transport in the vehicle will be a secure transport.

Figure 2C:
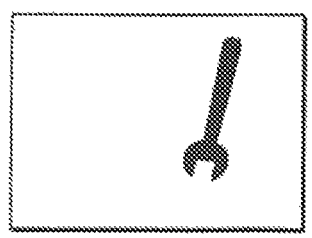

The cash box 10 preferably includes a display unit (see also FIGS. 2A-2C) by means of which the respective operating mode can be displayed which is currently used by the cash box for operation, and by means of which also the states concerning the standby of the battery and concerning the automatically depassivation is shown for the user. So, for example the standby state, as shown in FIG. 2c), can be represented by a symbol "OFF" which appears and indicates that the ink dyeing kit is disarmed, but that the cartridge is complete and ready for immediate use. Starting from here, it can change to various operating modes. For example, a change to a specific transportation mode which is characterized in that a timer is activated, which means that for the transport of the cash box a predetermined time interval is allowed, in which the transport must be completed. If the transport is not completed before the timer has expired, the invalidation unit 14 will be effectively triggered when being in the active operating mode or will be virtually triggered when being in the monitoring mode. "Virtual triggered" means that all data is stored like in the activated mode and that all other steps of the control unit 18 are processed accordingly, but that no effective trigger for the invalidation unit 14 is applied.

Thus it can be easily recognized on the above-described display what the current operating mode is, so that the person carrying/handling the cash box 10 knows how careful he/she must be in handling. Further, any tampering attempts and triggers of the validation unit 14 can be identified on the display.

As for the depassivation of the battery (see also 120 in FIG. 4), it will be explained further by means of FIGS. 5 and 6 the flow/sequence of a passivation method (see step 121 in FIG. 4) and described in more detail:

Depassivation of the battery (BATT) may occur by connecting a load and measuring the decrease and the subsequent increase of the clamp voltage (121). The clamp voltage (U) is checked to see if it exceeds a predetermined reference value (Ure±) or not (122). When the clamp voltage (U) exceeds the predeterminable reference value (Ure±), the depassivation is successfully completed (122; J) and the control procedure (130) is started (131). Otherwise, the depassivation is continued (121). It is then determined, for the entry into a first operating state (OFF), if an operating parameter is set or not (131). If the operating parameter is set, a first operating mode, by entry into the first operating state (OFF), is activated (132). If the operating parameter is not set, a second operating mode, by entry into a second operating state (init), is activated (133). It is then determined if in the first operating state (OFF), whether the operating parameter is still set or not (134). If the operating parameter is still set, the first operating state (OFF) is maintained and the first operating mode remains activated (132, 134). If not set, it is switched to the second operating state (init) changed (133). It is then determined if in the second operating state (init), whether the operating parameter is still not set or shall now be set (134'). If the operating parameter is still not is set, the second operating state (init) is maintained and the second operating mode remains activated (133, 134'). Otherwise, it is switched to the first operating state (OFF switch (132)).

For being subject to a passivation the battery is operated at a defined load, i.e. the battery is charged as much as this is needed for example to power the processor and the backlight of the LCD display. This may for example be 20 mA. Accordingly, the clamp voltage U decreased in the first few seconds from an off-load voltage of about 3.7 V (see point A) significantly down to a value of e.g. 3V, and then the voltage increases again (recovery phase B) until it finally reaches a level of saturation (section C).

The objective of measuring procedure is to determine whether the clamp voltage U reaches the level of the preset reference Uref after having passed a relatively short recovery period, said level Uref is e.g. about 3.35V. This change should occur within a sufficiently short time, e.g. after 60 seconds. If the reference voltage Uref should, however, not be reached, this is an indication for a very poor battery condition, in which even a depassivation cannot achieve a significant improvement. If the clamp voltage U shows within the first 60 seconds a significant decline (which usually is caused by heating of the battery), then the measurement and the depassivation will be interrupted.

Figure 5:
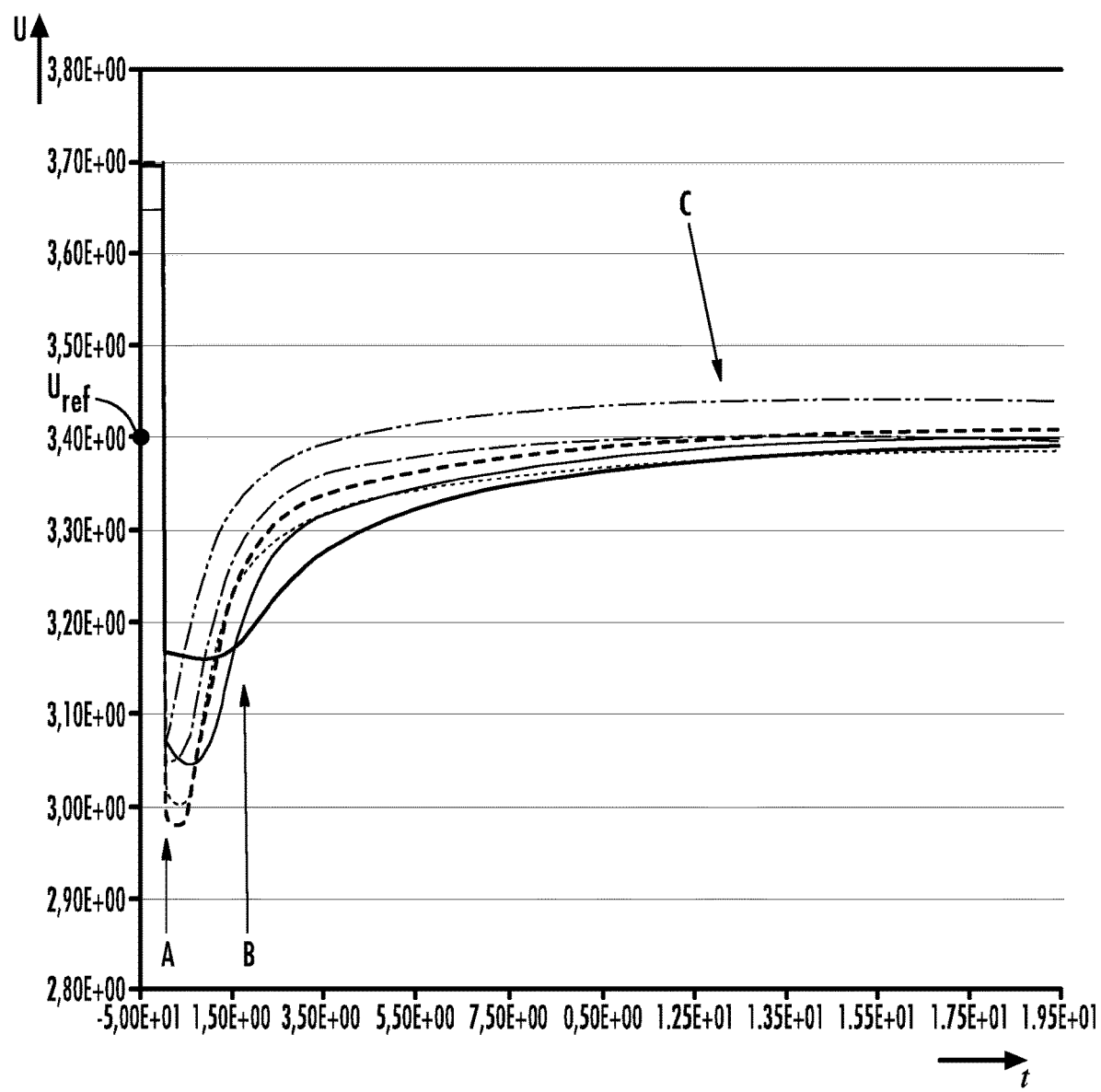
FIG. 5 illustrates the time-based monitoring of the clamp voltage during the depassivation of the battery.
Figure 6:
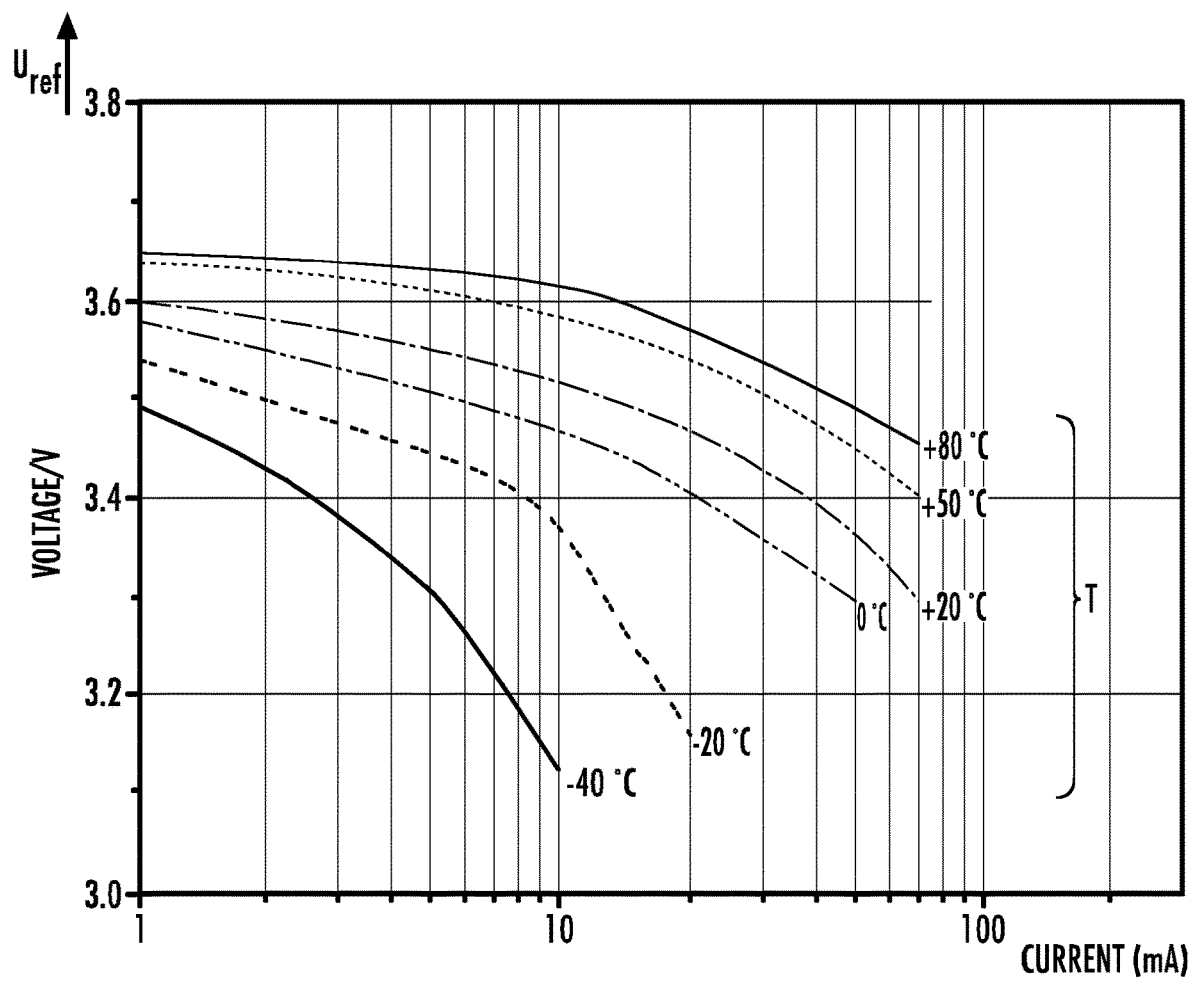
FIG. 6 illustrates a temperature-dependent adaptation of a reference voltage for monitoring of the clamp voltage during the depassivation of the battery.

FIG. 5 shows several curves in the form of a family of curves, which represent true development of the measured clamping voltage. Specifically, within the first 5 seconds after the switching to the load, only the battery voltage or clamp voltage U is measured; but no evaluation will be made. The maximum clamp voltage will always be stored.

In the following 55 seconds it will be checked whether the maximum battery voltage U has reached or exceeded the reference value of e.g. 3.35V. However, if the battery voltage should drop sometime in this time, this indicates a collapse of the clamp voltage U and the passivation is blocked, because no further increase in the battery voltage (recovery) is to be expected.

However, if the clamp voltage U have risen to the end of the measurement time length of 60 seconds, the maximum reached voltage is again measured and evaluated and compared with the reference value Uref (the minimum depassivation voltage) of 3.35V.

Instead of a fixed predetermined reference value Uref, it can preferably also be a value being variable in dependence on the ambient temperature T. This is illustrated by means of FIG. 6.

Accordingly, at a room temperature of about 20° C. and at a very low load current I, the reference value Uref will be around 3.6V. For a larger load current of e.g. 20 mA (see also FIG. 5) the reference value Uref will become low; this means: the higher the load current I the less is the reference value Uref. With respect to the outside temperature or ambient temperature T the reference value Uref will increase when the temperature increase. The reference value or the reference voltage is thus shifted depending on the temperature. FIG. 6 shows several curves in ranges between −40° C. to +80° C. By adjusting the reference value Uref or the reference voltage to the prevailing temperature, a better measurement, and also a better depassivation can be achieved.

In summary, the invention achieves the effect that, in such batteries, which suffer from passivation due to non-use, the batteries are depassivated in the context with standard procedures performed within a cash and valuables container, if necessary, so that the cash and valuables container is always ready for use without restrictions. Thus, the cash and valuables container can completely be put into a ready-to-use or ready-to-deliver status within the context of a service case or a manufacturing/production, respectively, wherein the existing hardware and software resources can be used.

The depassivation of the battery can, for example, be integrated into ink dyeing electronics or control. By means of the invention, the cash and valuables container, especially a portable container, can monitor and control its own components and the battery status and can, in dependence on the results for the electronically controllable components, activate (start) or deactivate (stop) the appropriate mode.

LIST OF REFERENCE NUMBERS

10 Cash and valuables container, here in the form of a cash box
12 Receiving area/compartment for banknotes or vouchers and the like
14 Invalidation unit containing an ink dyeing or staining device
16 Sensor unit having one or more sensors
18 Control unit
20 Storage element for storing data on tampering
22 Inventory storage for storing data on cash levels of banknotes
BATT battery, here Lithium-Ion battery for power supply
100 Method
110, 120, 130 Step sequences
121-123 Steps of the second step sequence 120
131-133 Steps of the third step sequence 130
TB Display element, here for displaying the battery/clamping voltage and for progress of depassivation (progress/timer bar)
U, Uref Clamp voltage or Reference value
T Temperature
Off, init States (operating states/conditions) of the ink dyeing device
BatteryCheck State/Routine for battery testing and depassivation

What is claimed is:

1. A method for depassivation of a battery of a cash and valuables container having at least one electronically controllable component, the electronically controllable component having an operating parameter which can be set and can be not set, and an associated control circuit powered by the battery to measure the decrease and subsequent increase of the battery voltage, the method comprising;
   the control circuit executing the depassivation of the battery operating at a defined load in connection with an activation or deactivation of a first control procedure or a sub-routine thereof in response to the measured value of the battery voltage in comparison to the predetermined reference value;
   the associated control circuit executing, after successful completion of depassivation of the battery, a second control procedure for the at least one electronically controllable component; and
   the second control procedure further including the continuous checking of whether the operating parameter of the electronically controllable component is set and whether the operating parameter of the electronically controllable component is not set, for an entry into an operating state;
   activating, if the operating parameter is set, a first operating mode, by entry into the first operating state;
   activating, if the operating parameter is not set, a second operating mode, by entry into a second operating state;
   checking, while in the first operating state, if the operating parameter is still set;
   maintaining the first operating state if the operating parameter is still set, the first operating mode remaining activated;
   otherwise, it is switched to the second operating state;
   checking, while in the second operating state, if the operating parameter is still not set;
   maintaining the second operating state if the operating parameter is still not, the second operating mode remaining activated;
   otherwise, it is switched to the first operating state.

2. The method of claim 1, further comprising executing the depassivation of the battery each time case before and/or after a first execution of the at least one control procedure or a sub-routine thereof.

3. The method of claim 1, further comprising executing the depassivation of the battery in dependence on operating conditions and/or operating modes that are activated and/or deactivated by the at least one control procedure or by a sub-routine thereof.

4. The method of claim 1, wherein by means of the at least one control procedure or sub-routine, in dependence on variable operating parameters, a plurality of operating modes for the at least one electronically controllable component is enabled/activated or disabled/deactivated, and that at least one of the operating modes is enabled or disabled only when the depassivation of the battery has been executed successfully.

5. The method of claim 4, wherein the depassivation of the battery is executed before each first activation or deactivation of at least one of the operating modes.

6. The method of claim 1, wherein the valuables container is a removable container for valuables, the at least one electronically controllable component is a validation unit for in the cash and valuables container transported valuables, banknotes and/or vouchers, and the control procedure for an event-driven operation of the invalidation unit is carried out for an operation involving an invalidation of the valuables that when occurring on the cash and valuables container tamper event is carried out.

7. The method of claim 1, wherein in the step for checking the clamp voltage, said voltage is monitored for a predetermined period of time to obtain the temporal development of the clamp voltage in comparison with the reference value, and that depending on the identification it is decided whether to end or to continue with the depassivation of the battery.

8. The method of claim 7, wherein in the step for checking the clamp voltage, the reference value is preset in dependence on the ambient temperature, and in particular that reference value is increased when the ambient temperature rises.

9. The method of claim 1, wherein the operating modes include an output state to start the operation of the cash and valuables container, and an initialization state for the factory delivery of the cash and valuables container.

10. The method of claim 1, wherein the operating mode of the respective activated operation state is displayed on a display of the cash and valuables container, and a depassivation mode is displayed when the depassivation of the battery is executed.

11. The method of claim 10, further comprising showing, on said display or on a specific one of the cash and valuables container, a display element for the magnitude of the measured clamp voltage.

12. The method of claim 1, wherein the depassivation of the battery is executed after the deactivation of the control procedure or of a sub-routine thereof.

13. A cash and valuables container, comprising at least one electronically controllable component having an operating parameter which can be set and can be not set, an associated control circuit and a battery, the control circuit being configured to execute one or more control procedures for the at least one electronically controllable component, wherein
   the control circuit is capable of initiating depassivation of the battery, and
   the one or more control procedures includes;

activating, if the operating parameter is set, a first operating mode, by entry into the first operating state;
activating, if the operating parameter is not set, a second operating mode, by entry into a second operating state;
checking, while in the first operating state, if the operating parameter is still set;
maintaining the first operating state if the operating parameter is still set, the first operating mode remaining activated;
otherwise, it is switched to the second operating state;
checking, while in the second operating state, if the operating parameter is still not set;
maintaining the second operating state if the operating parameter is still not, the second operating mode remaining activated;
otherwise, it is switched to the first operating state.

14. The cash and valuables container of claim 13, wherein the cash and valuables container comprises at least one of the following features:
the battery is a lithium battery;
the control circuit comprises a micro-controller;
the at least one electronically controllable component is an ink dyeing system, for the cash, banknotes, vouchers and valuables being transported in the container;
the cash and valuables container comprises a display for displaying operating modes of each activated operating state and for displaying a depassivation mode and for displaying a display element for the magnitude of the measured clamp voltage of the battery.

* * * * *